United States Patent
Wang et al.

(10) Patent No.: US 12,246,569 B2
(45) Date of Patent: Mar. 11, 2025

(54) IN-CORNER MODULAR ELECTRIC WHEEL SYSTEM INTEGRATING ADJUSTABLE KING PIN AND KING PIN-TYPE STEERING UNIT

(71) Applicant: Jilin University, Changchun (CN)

(72) Inventors: Junnian Wang, Changchun (CN); Yitong Wang, Changchun (CN); Zidong Zhou, Changchun (CN); Siqing Wang, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 18/798,262

(22) Filed: Aug. 8, 2024

(65) Prior Publication Data

US 2024/0391285 A1    Nov. 28, 2024

(30) Foreign Application Priority Data

May 8, 2024    (CN) .......................... 202410557892.9

(51) Int. Cl.
*B60G 17/016*    (2006.01)
*B60K 7/00*    (2006.01)

(52) U.S. Cl.
CPC ........ *B60G 17/0162* (2013.01); *B60K 7/0007* (2013.01); *B60G 2204/30* (2013.01)

(58) Field of Classification Search
CPC .............. B60G 17/016; B60G 17/0163; B60G 2204/30; B60G 17/0162; B60K 7/0007; B62D 7/18

See application file for complete search history.

(56) References Cited

U.S. PATENT DOCUMENTS

| | | | | |
|---|---|---|---|---|
| 4,371,191 A | * | 2/1983 | Goldberg | B60G 17/018 280/5.521 |
| 12,059,939 B2 | * | 8/2024 | Lee | B60G 3/26 |
| 12,077,234 B2 | * | 9/2024 | Aknin | B62D 5/12 |
| 2003/0111812 A1 | * | 6/2003 | Carlstedt | B60G 7/006 280/124.16 |
| 2020/0207405 A1 | * | 7/2020 | Kuribayashi | B60G 3/18 |

(Continued)

FOREIGN PATENT DOCUMENTS

| | | | | |
|---|---|---|---|---|
| CN | 112092554 A | | 12/2020 | |
| EP | 4183665 A1 | * | 5/2023 | B60G 3/01 |

(Continued)

*Primary Examiner* — Paul N Dickson
*Assistant Examiner* — Maxwell L Meshaka

(57) ABSTRACT

An in-corner modular electric wheel system integrating adjustable king pin and king pin type steering unit includes a wheel assembly, a steering system, a king pin inclination adjusting system and a suspension system. The wheel assembly is configured to support a load of a vehicle, transmit a driving torque and determine a toe angle and a camber angle. The steering system is a king pin type steering system, and is configured for an omni-directional independent wheel steering. The king pin inclination adjusting system is sleeved on the king pin, and is configured to adjust an inclination of the king pin without changing the camber angle. The suspension system has an unequal-length double-wishbone suspension structure, and is provided with a coil spring and a shock absorber to mitigate road impacts and improve ride comfort.

9 Claims, 7 Drawing Sheets

(56) References Cited

U.S. PATENT DOCUMENTS

| | | | | |
|---|---|---|---|---|
| 2023/0174141 A1* | 6/2023 | Mauritz | ............. | B66F 9/07568 |
| | | | | 180/411 |
| 2023/0391392 A1* | 12/2023 | Choi | ................... | B62D 5/0418 |
| 2024/0391285 A1* | 11/2024 | Wang | ................ | B60G 17/0162 |

FOREIGN PATENT DOCUMENTS

| | | | | |
|---|---|---|---|---|
| GB | 2582640 A | * | 9/2020 | .............. B60G 3/20 |
| KR | 20070107322 A | * | 11/2007 | |

\* cited by examiner

IN-CORNER MODULAR ELECTRIC WHEEL SYSTEM INTEGRATING ADJUSTABLE KING PIN AND KING PIN-TYPE STEERING UNIT

CROSS-REFERENCE TO RELATED APPLICATIONS

This application claims the benefit of priority from Chinese Patent Application No. 202410557892.9, filed on May 8, 2024. The content of the aforementioned application, including any intervening amendments thereto, is incorporated herein by reference in its entirety.

TECHNICAL FIELD

This application relates to the field of intelligent drive-by-wire chassis for electric vehicles, and more particularly to an in-corner modular electric wheel system integrating an adjustable king pin and a king pin-type steering unit.

BACKGROUND

With the continuous development of electric vehicle technology, the traditional separate control of transmission system, driving system, braking system, and steering system does not meet the requirement of the current vehicle chassis control. With the development of distributed drive architectures, active suspension systems, electronic braking systems and steer-by-wire systems, the lateral-longitudinal-vertical integrated control has been developed. This integrated control mode can significantly expand the control boundaries of modern vehicles, enabling technical maneuvers that traditional vehicles cannot achieve. It can effectively improve the vehicle dynamics, fuel economy, ride comfort, braking performance, and handling stability. However, due to the structural constraints, modern vehicles can still be optimized in many aspects, such as variable-structure suspension devices that can actively change the king pin inclination, and king pin steering devices with omni-directional steering function.

Due to the structural constraints, traditional steering systems have difficulty in achieving the omni-directional steering maneuver, which significantly restricts the vehicle flexibility. By means of the coordinated control of four-wheel king pin steering, vehicles can achieve the steering and translation maneuvers that the traditional vehicles cannot perform, greatly enhancing the vehicle agility. For non-variable structure suspension systems, due to the original design requirement, wheel alignment parameters have been set during the initial design stage, and are difficult to change later. This means that the vehicle maneuvering characteristics have been determined after the design stage, failing to meet the diverse driving needs of different drivers on various road surfaces. Variable-structure suspension devices can effectively address this issue, significantly expanding the control boundaries of the vehicle chassis.

Furthermore, for the sake of agility of vehicles with the omni-directional steering function, the king pin inclination is often reduced or even eliminated to weaken the tendency of the wheels towards the ground and mitigate steering resistance during the omni-directional steering process. However, the presence of the king pin inclination can effectively improve the handling stability of the vehicle during the straight-line travelling. To overcome the contradiction, a king pin steering system with a variable king pin inclination is proposed herein, which can retain the king pin inclination to increase the aligning torque during the straight-line traveling or small-angle steering, thereby enhancing the vehicle handling stability, and can actively reduce the king pin inclination to enhance the agility during the omni-directional steering. It is also worth noting that the change in the wheel camber is often inevitable for most devices with the king pin inclination adjusting function. Therefore, it is of great significance to find a way to keep the camber angle stable while adjusting the king pin inclination.

SUMMARY

This application provides an in-corner modular electric wheel system and the in-corner modular electric wheel system has the functions of the king pin-type steering and active adjustment of the king pin inclination.

The application provides an in-corner modular electric wheel system, comprising:
a wheel assembly;
a steering system;
a king pin inclination adjusting system; and
a suspension system;
wherein the wheel assembly is configured to support a load of a vehicle, transmit a driving torque and determine a toe angle and a camber angle; a drive motor and a braking system are provided inside the wheel assembly to control longitudinal acceleration and deceleration of the vehicle;
the steering system is a king pin steering system, and is configured to perform omni-directional wheel-independent steering; the steering system comprises a steering motor assembly, a king pin and a steering arm; the king pin is connected to the wheel assembly through a first pin shaft, and the steering arm is connected to the wheel assembly through a second pin shaft, so as to drive the wheel assembly to deflect to control a lateral movement of the vehicle;
the king pin inclination adjusting system is integrally sleeved on the king pin; the king pin inclination adjusting system is connected to the wheel assembly through a first connecting rod, and is connected to the suspension system through a second connecting rod; the king pin inclination adjusting system is coaxially provided with an actuator motor and a lead-screw; the lead-screw is provided with a lead-screw nut; the first connecting rod and the second connecting rod are mounted on the lead-screw nut; the actuator motor is configured to drive the lead-screw to rotate, so as to allow the lead-screw nut to move along an axial direction of the king pin to adjust an inclination of the king pin through the linkage without changing the camber angle, thereby enabling active change of a handling characteristic of the vehicle; and
the suspension system has an unequal-length double-wishbone suspension structure; the suspension system is connected to a bottom of the king pin through a ball pin, and is connected to an upper end of the king pin inclination adjusting system through a third pin shaft; the suspension system is provided with a first lug configured for mounting a steering motor base; the suspension system is further provided with a coil spring and a shock absorber.

In an embodiment, the wheel assembly comprises:
a hub;
a wheel shaft;
the drive motor;
the braking system; and
a wheel bracket;

wherein the hub comprises a wheel rim and a spoke; the wheel rim is configured to mount a tire; a center of the spoke is provided with a first through-hole to allow the wheel shaft to pass through; and a plurality of first threaded holes are circumferentially provided at the first through-hole to mount the drive motor;

a first end of the wheel shaft is provided with a first thread, and is connected to the hub through an end nut and a hub bearing; a middle of the wheel shaft is provided with a first spline and a first shaft shoulder; a second end of the wheel shaft is provided with a flange with a second threaded hole to mount the wheel bracket;

the drive motor is an external-rotor motor; a stator of the drive motor is splinedly mounted at the first spline; and a rotor of the drive motor is boltedly connected to the plurality of first threaded holes;

the braking system comprises a brake disc and a brake caliper; the brake disc is boltedly mounted at a housing of the rotor of the drive motor, and is configured to rotate with the hub; the brake caliper is configured to clamp an outer edge of the brake disc; there is a brake clearance between the brake caliper and the brake disc; the brake caliper is provided with a second lug for securing the brake caliper; and the wheel bracket has a plate-shaped structure; a middle of the wheel bracket is boltedly mounted at the flange of the wheel shaft; there is an axial clearance between the brake disc and the wheel bracket; a top of the wheel bracket is provided with an upper support arm; a bottom of the wheel bracket is provided with a lower support arm; an upper portion of an inner side of the wheel bracket is provided with a third lug for mounting the steering arm; a middle portion of the inner side of the wheel bracket is provided with a fourth lug for mounting the first connecting rod; a lower portion of the inner side of the wheel bracket is provided with a fifth lug for mounting the king pin; and a front side of the wheel bracket is provided with a sixth lug for fixing the brake caliper.

In an embodiment, the steering system comprises:
the steering motor base;
wherein the king pin has a cylindrical structure; the bottom of the king pin is provided with a third threaded hole to mount the ball pin of a steering knuckle of the suspension system; a middle of the king pin is provided with a seventh lug and a second shaft shoulder for mounting the actuator motor; and a top of the king pin is provided with a second spline;

a first end of the steering arm is provided with an eighth lug; a second end of the steering arm is provided with a ninth lug; the eighth lug is connected to the wheel bracket through the second pin shaft; the ninth lug is connected to the steering motor assembly through a fourth pin shaft; the eighth lug is separated from the ninth lug; a distance between the eighth lug and the ninth lug is variable; an outer side of the ninth lug is provided with a first guide rod; the first guide rod has a cylindrical structure; an inner side of the eighth lug is provided with a second through-hole; and the first guide rod is configured to be in slide fit with the second through-hole to make a length of the steering arm variable;

an output end of the steering motor assembly is connected to the second spline through a first spline slot; both sides of the output end of the steering motor assembly are each provided with the fourth pin shaft to be connected to the ninth lug; a top of the steering motor assembly is provided with a tenth lug; and a first end of the steering motor base is provided with an eleventh lug; a second end of the steering motor base is provided with a twelfth lug; the eleventh lug is connected to the tenth lug through a fifth pin shaft; the twelfth lug is connected to the steering knuckle of the suspension system through a sixth pin shaft; the eleventh lug is separated from the twelfth lug; a distance between the eleventh lug and the twelfth lug is variable; an inner side of the eleventh lug is provided with a second guide rod; an outer side of the twelfth lug is provided with a third through-hole; and the second guide rod is configured to be in slide fit with the third through-hole to make a length of the steering motor base variable.

In an embodiment, the steering motor assembly comprises:
a steering motor; and
a steering deceleration mechanism;
wherein a stator of the steering motor is fixed to a housing of the steering motor; a rotor of the steering motor is connected to an input end of the steering deceleration mechanism; the steering deceleration mechanism is coaxially arranged with the steering motor, and is configured to increase an output torque of the steering motor; an output end of the steering deceleration mechanism is provided with the first spline slot to be connected to the second spline to amplify and transmit the output torque of the steering motor to the king pin, wherein the first spline slot is an internal spline slot; both sides of the housing of the steering motor are each provided with the fifth pin shaft to mount the steering arm; and a top of the housing of the steering motor is provided with the tenth lug to be connected to the steering motor base through the fifth pin shaft.

In an embodiment, the king pin inclination adjusting system comprises:
an actuator motor assembly;
the lead-screw;
the first connecting rod;
the lead-screw nut; and
the second connecting rod;
wherein the actuator motor assembly is sleeved on the king pin, and is connected to the seventh lug through a seventh pin shaft; and an output end of the actuator motor assembly is provided with a third spline;

the lead-screw is hollow, and is sleeved on the king pin through a tapered roller bearing; a bottom of the lead-screw is provided with a second spline slot, and is connected to the output end of the actuator motor assembly; an outer side of the lead-screw is provided with a second thread to ensure that the lead-screw nut is self-locked on the lead-screw under the action of an external force in a case that the lead-screw does not rotate, so as to make wheel alignment parameters fixed; and each of top and bottom ends of the second thread is provided with a limit structure to restrict a maximum axial displacement of the lead-screw nut; and the first connecting rod is provided with a first pin shaft hole and a second pin shaft hole; the first connecting rod is connected to the lead-screw nut through the first pin shaft hole and an eighth pin shaft; the first connecting rod is connected to the wheel bracket through the second pin shaft hole and a ninth pin shaft;

the lead-screw nut is threadedly mounted on the lead-screw; a lower end of an external surface of the lead-screw nut is sleevedly provided with a nut collar; the nut collar is configured to rotate relative to an axial direction of the lead-screw nut, and restrict an axial movement of the lead-screw nut; both sides of the upper end of the lead-screw nut are each provided with the third pin shaft to be connected to the second connecting rod; and both sides of the nut collar are each provided with the eighth pin shaft to be connected to the first connecting rod; and the second connecting rod is provided with a third pin shaft hole and a fourth pin shaft hole; the second connecting rod is connected to the third pin shaft through the third pin shaft hole and a tenth pin shaft; and the second connecting rod is connected to the steering knuckle through the fourth pin shaft hole and an eleventh pin shaft.

In an embodiment, the actuator motor assembly comprises:

the actuator motor; and
a deceleration mechanism;
wherein the actuator motor is a hollow internal-rotor motor; and a stator of the actuator motor is boltedly connected to the seventh lug;
a rotor of the actuator motor is in splined connection with an input end of the deceleration mechanism; and the deceleration mechanism is configured to increase and transmit an output torque of the actuator motor to the lead-screw through the third spline.

In an embodiment, the suspension system comprises:
a shock absorber assembly;
an upper wishbone;
a shock absorber arm;
a lower wishbone; and
the steering knuckle;
wherein the shock absorber assembly comprises the shock absorber and the coil spring; the shock absorber has a cylindrical structure; the shock absorber and the coil spring are arranged coaxially; a bottom of the shock absorber assembly is provided with a support rod; the shock absorber assembly is configured to cushion road impact and reduce vibration amplitude;
the upper wishbone comprises two first swing arms intersecting with each other; an intersection of the two first swing arms is provided with a fifth pin shaft hole for connection with the steering knuckle; an end of each of the two first swing arms away from the intersection of the two first swing arms is provided with a sixth pin shaft hole for connection with a body of the vehicle or a subframe of the vehicle;
the shock absorber arm has a cylindrical tube structure; a top of the shock absorber arm is provided with a mounting hole to be fixedly connected to the support rod; and a bottom of the shock absorber arm is provided with a thirteenth lug;
the lower wishbone comprises two second swing arms intersecting with each other and a cross arm; the lower wishbone has an A-shaped structure; an intersection of the two second swing arms is provided with a seventh pin shaft hole to be connected to the steering knuckle; an end of each of the two second swing arms away from the intersection of the two second swing arms is provided with an eighth pin shaft hole for connection with the body of the vehicle or the subframe of the vehicle; and an upper end surface of the lower wishbone is provided with a fourteenth lug to be connected to the thirteenth lug through a twelfth pin shaft; and the steering knuckle has an L-shaped structure; a bottom of the steering knuckle is provided with a ball pin seat to be connected to the king pin through the ball pin; an upper portion of an inner side of the steering knuckle is provided with a fifteenth lug, and the fifteenth lug is connected to the upper wishbone through a thirteenth pin shaft; a lower portion of the inner side of the steering knuckle is provided with a sixteenth lug, and the sixteenth lug is connected to the lower wishbone through a fourteenth pin shaft; an upper portion of an outer side of the steering knuckle is provided with a seventeenth lug, and the seventeenth lug is connected to the second connecting rod through the eleventh pin shaft; and a top of the steering knuckle is provided with the first lug to be connected to the steering motor base through the sixth pin shaft.

In an embodiment, an angle between the king pin and the steering knuckle is configured as a first angle; an angle between the king pin and the wheel bracket is configured as a second angle; in a case that the vehicle is in a stationary state and a position of the steering knuckle is determined, the first angle is configured to determine the inclination of the king pin, and the first angle and the second angle are configured to determine the camber angle; and a position of the fourth lug, a position of the fifth lug, a length of the first connecting rod, a length of the second connecting rod, a position of the ball pin seat, a position of the seventeenth lug, and a structure of the second thread are configured such that the first angle is variable, and a sum of the first angle and the second angle does not change during motion of the lead-screw nut between an upper limit and a lower limit, thereby making the camber angle unchanged while changing the inclination of the king pin.

In an embodiment, a steering control method using the in-corner modular electric wheel system, comprising:

detecting, by a steering control unit, a steering command sent by a vehicle driver or an autonomous driving decision unit; and determining, by the steering control unit, whether a steering angle in the steering command is greater than a preset steering angle, if yes, executing a steering control action;

detecting, by the steering control unit, a vehicle speed; determining, by the steering control unit, whether the vehicle speed is less than a preset speed, if yes, continuing to perform the steering control action; otherwise, exiting the steering control action and reporting an exit reason;

giving, by the steering control unit, a first operation command to the actuator motor; after receiving the first operation command, adjusting, by the actuator motor, the inclination of the king pin to a minimum value; reporting, by the actuator motor, an inclination adjustment completion command;

after receiving the inclination adjustment completion command, giving, by the steering control unit, a second operation command to the steering motor; after receiving the second operation command, adjusting, by the steering motor, a wheel angle to a preset angle, and reporting, by the steering motor, a steering completion command; and after receiving the steering completion command, completing, by the steering control unit, the steering control action, and reporting, by the steering control unit, a completion signal.

The benefits of the present application are described as follows. The king pin type steering function herein can effectively increase the steering angle, thereby improving vehicle flexibility and providing more steering functions for decision-makers (human driver or autonomous driving system). To overcome the contradiction between reducing the king pin inclination to improve flexibility during the omni-directional steering and increasing the king pin inclination to enhance handling stability during the small-angle steering. This present application also provides a device that can actively adjust the king pin inclination. This device disassembles the steering knuckle, which traditionally is responsible for suspension support, wheel steering, and wheel alignment determination, into three separate components including the steering knuckle, the adjustable king pin, and the wheel bracket. This achieves a decoupling of these three functions, so as to allow for active adjustment of the king pin inclination without significantly affecting the camber angle, while ensuring the normal operation of suspension movement and king pin steering. Additionally, this configuration proposes an active adjustable structure system on the foundation that modern vehicles have already implemented distributed drive architecture, active suspension systems, electronic braking systems, and steer-by-wire systems. It achieves the high integration and centralized control of various active chassis systems on one in-corner wheel module, and increases the controllable degrees of freedom of the integrated chassis, effectively avoiding the unreasonable issue of non-adjustable handling characteristics post-vehicle design, and significantly expands the control boundaries of modern vehicle chassis.

DETAILED DESCRIPTION OF EMBODIMENTS

Further detailed descriptions of the present application will be provided below in conjunction with the accompanying drawings to enable those skilled in the art to implement the technical solutions provided herein.

Figure 1:
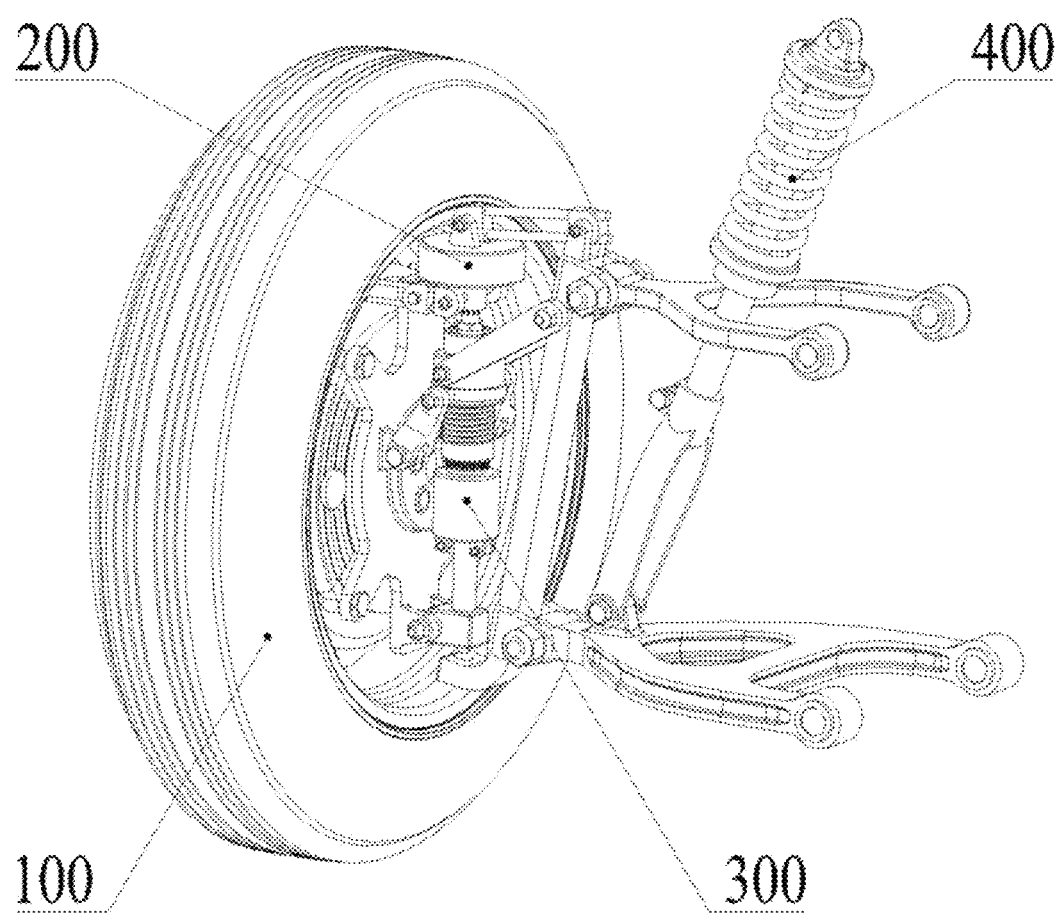
FIG. 1 is an axonometric diagram of an in-corner modular electric wheel system according to an embodiment of the present application.

Referring to FIG. 1, an in-corner modular electric wheel system integrating adjustable king pin and king pin type steering unit is provided, mainly including a wheel assembly 100, a steering system 200, a king pin inclination adjusting system 300 and a suspension system 400.

Figure 2:
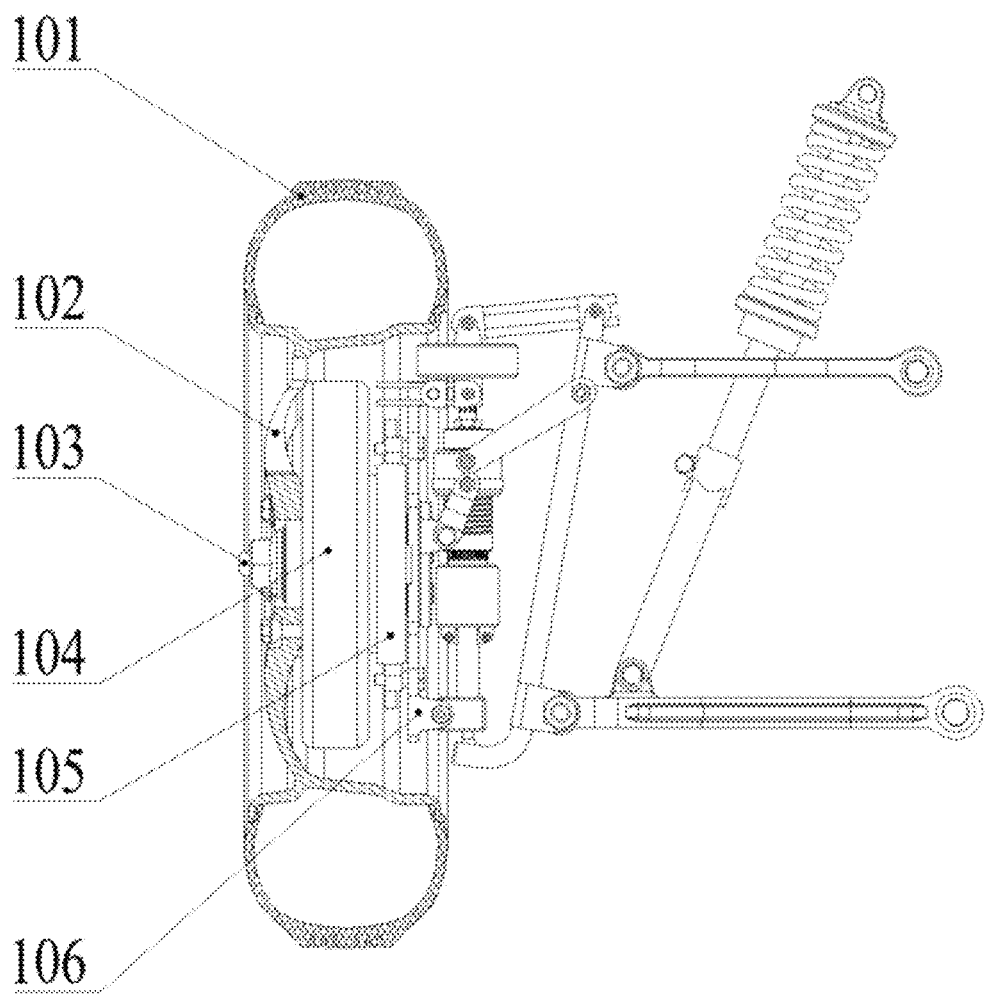
FIG. 2 is a sectional view of the in-corner modular electric wheel system according to an embodiment of the present application.

The wheel assembly 100 is configured to support the load of the vehicle, transmit the driving torque and determine the toe angle and the camber angle, a drive motor and a braking system are provided inside the wheel assembly. The configuration achieves distributed vehicle drive and electronic brake control and can control the longitudinal acceleration and deceleration movement of the vehicle. The wheel assembly 100 mainly includes a hub 102, a wheel shaft 103, the drive motor 104, the braking system 105 and a wheel bracket 106, as shown in FIG. 2.

The hub 102 includes a wheel rim and a spoke, and the wheel rim is configured to mount a tire 101. The center of the spoke is provided with a wheel shaft through-hole to allow the wheel shaft to pass through. The inner surface of the wheel shaft through-hole has a good machined finish to ensure proper fitment with a first hub bearing. Five threaded holes are circumferentially provided at the wheel shaft through-hole to mount the drive motor. These threaded holes are designed as countersunk head holes to ensure the hub has good aerodynamic characteristics during vehicle operation.

The head end of the wheel shaft 103 is provided with a thread and is connected to the wheel shaft through-hole through an end nut and a first hub bearing. The unthreaded part of the head end of the wheel shaft has a good machining surface to ensure the proper fitment with the hub bearing. The middle of the wheel shaft is provided with a spline and a shaft shoulder. The shaft shoulder is configured to ensure no axial displacement of a second hub bearing. The shaft shoulder has a good machining surface to ensure the proper fitment with the hub bearing. The tail end of the wheel shaft is provided with a flange with five threaded holes to mount the wheel bracket.

The drive motor 104 is an external-rotor motor. The drive motor has a good housing rigidity and is fixedly connected to the outer rotor of the drive motor to transmit torque. The stator of the drive motor is mounted on the spline of the wheel shaft via a spline connection and is limited in axial displacement by the hub and the brake disc. The housing of the external-rotor motor is securely connected to the threaded holes of the drive motor using bolts. The inner side of the housing of the external-rotor motor has threaded holes to mount the brake disc.

The braking system 105 includes a brake disc and a brake caliper. The brake disc has an internal flange, with the outer edge of the flange boltedly mounted at the threaded holes of the brake disc on the housing of the drive motor, rotating together with the hub. The internal flange of the brake disc is mounted on the wheel shaft through the second hub bearing, transmitting the axial load between the wheel shaft and the drive motor. The brake caliper should be either electromechanical or electrohydraulic and clamp onto the outer edge of the brake disc, maintaining an appropriate braking gap. Additionally, the brake caliper has caliper lugs for securing the brake caliper.

The wheel bracket 106 is plate-shaped overall. The middle of the wheel bracket is equipped with threaded holes for the wheel shaft and is boltedly mounted to the threaded holes on the wheel shaft and wheel bracket, leaving a gap with the brake disc of the braking system. The top and bottom parts are equipped with upper and lower support arms, respectively. The upper, middle, and lower portions of the inner side of the wheel bracket are respectively equipped with the steering arm lug, the king pin-to-wheel assembly connecting rod lug, and the king pin lug. Additionally, the front side of the wheel bracket is equipped with the caliper lugs for mounting the brake caliper of the braking system. The configuration of the wheel bracket ensures that there is an appropriate gap between the components of the king pin and the wheel bracket when the king pin inclination adjusting system adjusts the king pin inclination to the minimum value. Additionally, this configuration avoids any motion interference during the steering process. The wheel bracket, being an important load-bearing component of the in-corner modular electric wheel system, is made of metal materials with good load-bearing capacity.

Figure 3:
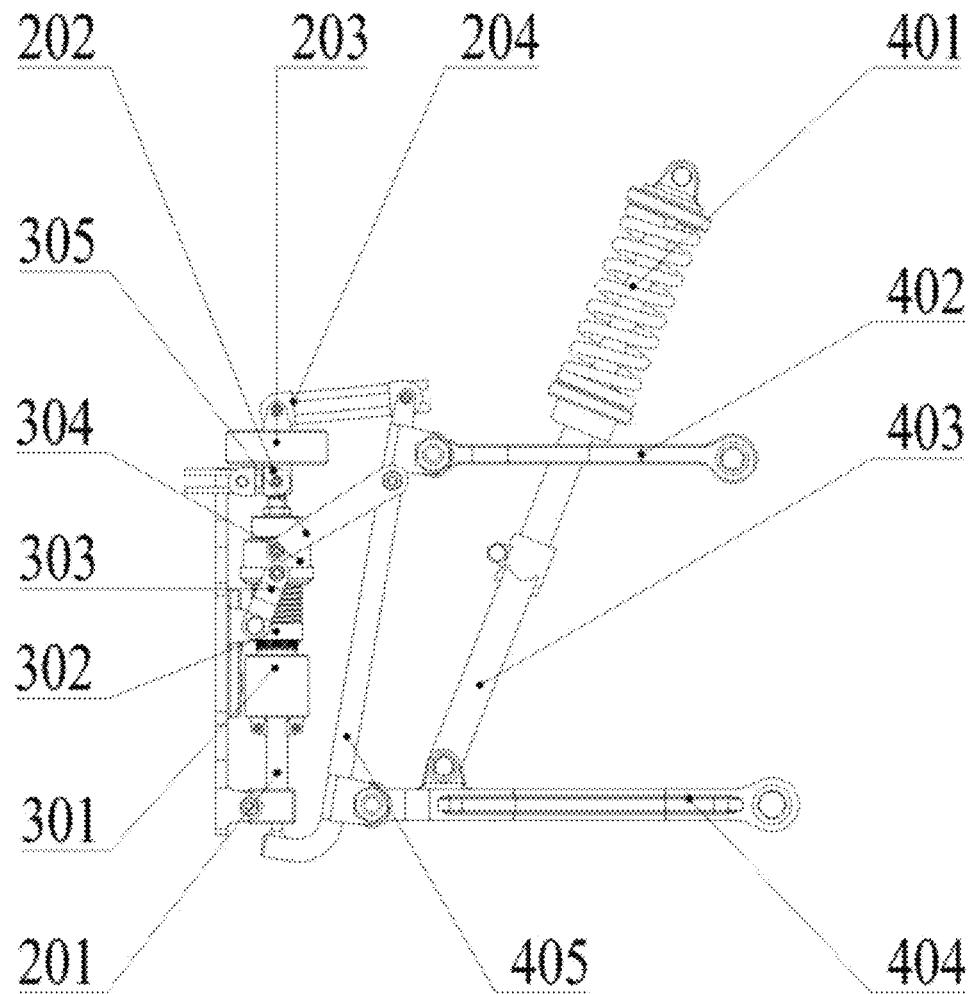
FIG. 3 is a front view of the in-corner modular electric wheel system according to an embodiment of the present application.
Figure 4:
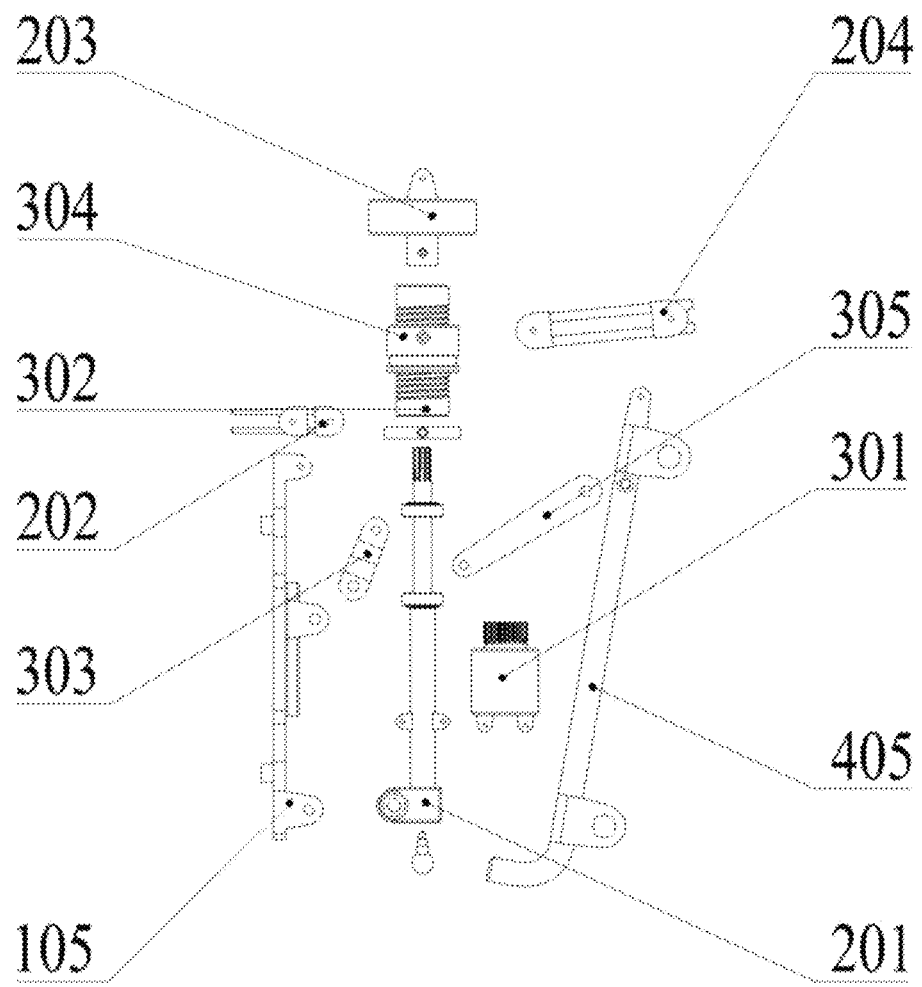
FIG. 4 is a partial exploded view of the in-corner modular electric wheel system according to an embodiment of the present application.

The steering system 200 is a king pin steering system, and is capable of achieving the omni-directional wheel-independent steering. It mainly includes the king pin 201, a steering arm 202, a steering motor assembly 203, and a steering motor base 204, as shown in FIG. 3. The king pin and the steering arm are connected to the wheel assembly via a pin shaft. The steering motor base is connected to the suspension system via a pin shaft, enabling vehicle steering and controlling the lateral movement of the vehicle.

The king pin 201 is entirely cylindrical. The bottom of the king pin is equipped with a threaded hole for installing a ball pin of the steering knuckle. The lower-middle portion of the king pin has the actuator motor lugs. The middle portion of the king pin is provided with a shaft shoulder and a thread, with a well-machined surface between them to ensure proper fitment with a tapered roller bearing. The top of the king pin has a spline to mount the steering motor. As a crucial load-bearing component of the in-corner modular electric wheel system, the king pin is made of metal materials with good load-bearing capacity.

The steering arm 202 is configured to increase the length of the steering lever arm and improve steering performance. The steering arm is configured to transmit steering torque to the wheel bracket only during the steering process. Therefore, it avoids motion interference between the king pin inclination adjusting system and the steering arm during the adjustment of the king pin inclination. The first and second ends of the steering arm have the wheel bracket lug and the steering motor lug respectively, and are connected to the wheel bracket and steering motor assembly via pin shafts, respectively. The wheel bracket lug is separated from the steering motor lug. The distance between the wheel bracket lug and the steering motor lug is variable. The outer side of the steering motor lug is equipped with a cylindrical guide rod, while the inner side of the wheel bracket lug has a corresponding through-hole to achieve variable length for the steering arm. The guide rod and the corresponding through-hole have low roughness and are well-lubricated to reduce friction to ensure smooth operation of the steering arm.

The steering motor assembly 203 includes a steering motor and a steering deceleration mechanism. The steering motor is an internal-rotor motor, with its stator fixed to the housing of the steering motor and its rotor fixedly connected to the input end of the steering deceleration mechanism. The steering deceleration mechanism is configured to amplify the output torque of the steering motor. The output end of the steering deceleration mechanism is provided with an internal spline slot that connects to the spline at the top of the king pin. Both sides of the output end of the steering motor assembly are also provided with pin shafts for installing the steering arm. The top of the housing of the steering motor has steering motor base lugs to be connected to the steering motor base via a pin shaft.

The steering motor base 204 is configured to secure the rotational motion of the housing of the steering motor and provide a base for the movement of the steering motor. This configuration ensures that there is no motion interference during the process of changing the king pin inclination and the process of transmitting torque. Both ends of the steering motor base have the steering motor lug and the steering knuckle lug respectively, and are connected to the lugs at the top of the steering motor assembly and the steering knuckle of the suspension system via pin shafts, respectively. The steering motor lug is separated from the steering knuckle lug. The distance between the steering motor lug and the steering knuckle lug is variable. A guide rod is provided on the inner side of the steering motor lug, and a corresponding through-hole is provided on the outer side of the steering knuckle lug to allow to make the length of the steering motor base variable. The guide rod and through-hole should have low roughness and be well-lubricated to reduce friction and ensure smooth operation of the steering motor base.

The king pin inclination adjusting system 300 is integrally sleeved on the king pin of the steering system and is connected to the wheel assembly and the suspension system via connecting rods. The king pin inclination adjusting system operates by using an actuator motor to drive a lead-screw, so as to allow the lead-screw nut to move along the axial direction of the king pin. This movement, transmitted through the connecting rods attached to the lead-screw nut, changes the king pin inclination without significantly altering the camber angle, thus enabling active change of a handling characteristic of the vehicle.

The actuator motor assembly 301 includes an actuator motor and a deceleration mechanism. The actuator motor is a hollow internal-rotor motor, with its stator housing boltedly connected to the actuator motor lug of the king pin. The output end of the actuator motor is connected to the input end of the deceleration mechanism. The deceleration mechanism increases the output torque of the actuator motor and transmits it to the lead-screw via a spline slot. The input and output ends of the deceleration mechanism are coaxially arranged.

The lead-screw 302 is hollow, and is sleeved on the king pin via tapered roller bearings. The internal surface of the lead-screw has a fine finish to ensure proper mating with the tapered roller bearings. The bottom portion of the lead-screw is provided with external splines slots that connect to the output end of the actuator motor assembly. The design of the external thread of the lead-screw ensures that the lead-screw nut is self-lock onto the lead-screw under the action of external force when the lead-screw does not rotate, thereby fixing the wheel alignment parameters. The lead-screw has limit structures at the top and bottom ends of the thread to restrict the axial movement of the lead-screw nut.

The king pin-to-wheel assembly connecting rod 303 is connected to the lead-screw nut and the wheel bracket at the pin shaft holes of the lead-screw nut and at the pin shaft holes of the wheel bracket, respectively, using pin shafts.

The lead-screw nut 304 is threadedly mounted on the lead-screw. The lower end of the external surface of the lead-screw nut is sleevedly provided with a nut collar. The nut collar is configured to rotate relative to an axial direction of the lead-screw nut, and restrict an axial movement of the lead-screw nut. Both sides of upper ends of the lead-screw nut are each equipped with the pin shaft of the king pin-to-suspension system connecting rod, which is used to connect the king pin-to-suspension system connecting rod. The front and rear sides of the nut collars are provided with the pin shaft of the king pin-to-wheel assembly connecting rod, which is used to connect the king pin-to-wheel assembly connecting rod.

The king pin-to-suspension system connecting rod 305 is provided with the pin shaft holes of the lead-screw nut and the pin shaft holes of the steering knuckle. The king pinto-suspension system connecting rod is connected to the lead-screw nut at the pin shaft holes of the lead-screw nut through a pin shaft. The king pin-to-suspension system connecting rod is connected to the steering knuckle at the pin shaft holes of the steering knuckle through a pin shaft. The arrangement of the king pin-to-wheel assembly connecting rod and the king pin-to-suspension system connecting rod on the lead-screw nut ensures that there is no movement interference between the king pin-to-wheel assembly connecting rod and the king pin-to-suspension system connecting rod during the adjustment of the king pin inclination and the steering process of the king pin.

The suspension system 400 has an unequal length double-wishbone suspension, is connected to the king pin of the steering system via a ball pin, and is connected to the king pin-to-suspension system connecting rod of the king pin inclination adjusting system via a pin shaft. The suspension system also includes steering motor base lugs for mounting the steering motor base, as well as coil springs and shock absorbers to mitigate road impacts and improve vehicle ride quality, enhancing the vehicle's vertical movement control.

The shock absorber assembly 401 mainly includes a cylindrical shock absorber and a coil spring, coaxially arranged, with a support rod at the bottom to cushion road impacts and reduce vibration amplitude. Passive suspension can be upgraded to active suspension to improve ride quality. The cylindrical shock absorber is replaced with a continuous damping control (CDC) adjustable damping shock absorber or an energy-regenerative shock absorber. The coil spring can be replaced with an air spring or a hydro-pneumatic spring, and actuators can be arranged in parallel with the spring shock absorber to further enhance the vehicle's vertical control capability.

The upper wishbone 402 consists of a set of swing arms intersecting with each other, with a pin shaft hole of the steering knuckle at the intersection of the swing arms. The ends of the two swing arms away from the intersection are respectively provided with two pin shaft holes for connecting to the vehicle body or subframe.

The top of the shock absorber arm 403 is fixedly connected to the support rod of the shock absorber assembly through the shock absorber mounting hole, and the bottom of the shock absorber arm is provided with a lower wishbone lug. The mounting hole is connected to the lower wishbone lug through two plate-like arms.

The lower wishbone 404 consists of two swing arms intersecting with each other and a cross arm, forming an A-shape overall. A pin shaft hole of the steering knuckle is located at the intersection of the two swing arms, and each of the ends of the two swing arms away from the intersection is respectively provided with a pin shaft hole for connecting to the vehicle body or subframe. The upper end surface is provided with a shock absorber lug to be connected to the shock absorber arm through a pin shaft.

The steering knuckle 405 is an L-shaped arm, with a ball pin seat at the bottom, which is connected to the king pin through a ball pin. The upper portion and lower portion of the inner side of the steering knuckle are provided with upper wishbone lug and lower wishbone lug respectively, which are connected to the upper wishbone lug and lower wishbone through pin shafts, respectively. The upper portion of the outer side of the steering knuckle is provided with a king pin-to-suspension assembly connecting rod lug, which is connected to the king pin-to-suspension assembly connecting rod through a pin shaft. The top of the steering knuckle is provided with a steering motor base lug, which is connected to the steering motor base through a pin shaft.

The angle between the king pin and the steering knuckle is configured as a first angle and the angle between the king pin and the wheel bracket is configured as a second angle, in the case that the vehicle is in a stationary state and the position of the steering knuckle is determined, the first angle is configured to determine the king pin inclination, the first angle and the second angle are configured to determine the camber angle.

The position of the king pin-to-wheel assembly connecting rod lug of the wheel bracket, the position of the king pin lug of the wheel bracket, the length of the king pin-to-wheel assembly connecting rod, the length of the king pin-to-suspension system connecting rod, the position of the ball pin seat, the position of the king pin-to-suspension system connecting rod lug, and the structure of the thread of the lead-screw are configured such that during the motion of the lead-screw nut between an upper limit and a lower limit, the first angle is variable and the sum of the first angle and the second angle does not change, thereby meeting the requirement of no change in the camber angle when the king pin inclination is controllably changed.

Figure 5:
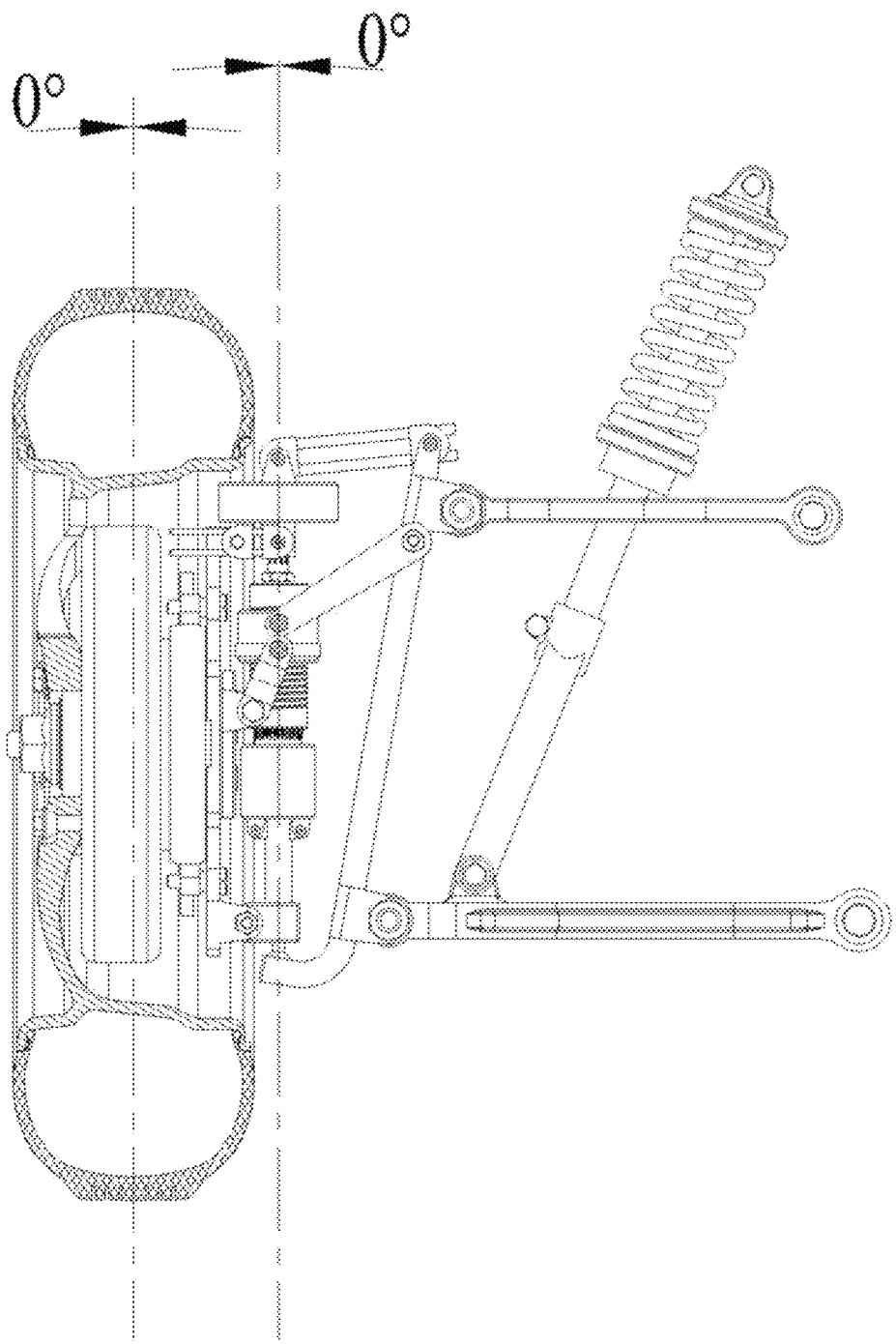
FIG. 5 schematically illustrates the in-corner modular electric wheel system according to an embodiment of the present application with the minimum king pin inclination.
Figure 6:
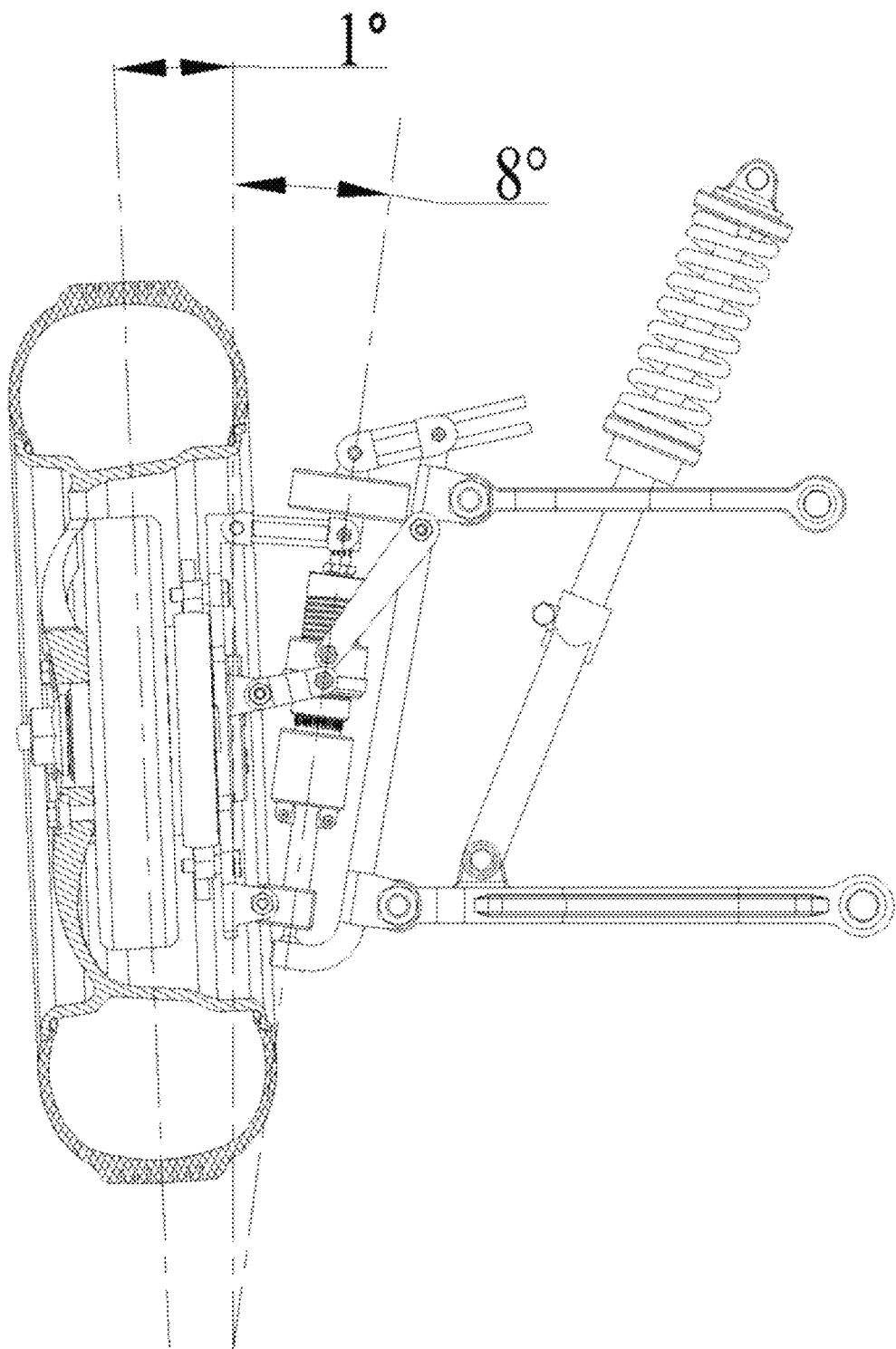
FIG. 6 schematically illustrates the in-corner modular electric wheel system according to an embodiment of the present application with the maximum king pin inclination.

A design result is described as follows, which does not solely represent the scope of the present application. When the lead-screw nut is at the upper limit position, as shown in FIG. 5, the first angle reaches its maximum, indicating that the king pin inclination reaches its minimum, which is 0°. To further improve the flexibility of the omni-directional wheel steering, the sum of the first angle and the second angle in the state of the lead-screw nut being at the upper limit position is the same as the steering knuckle inclination in the stationary state, making the camber angle 0°. When the lead-screw nut is at the lower limit position, as shown in FIG. 6, the first angle reaches its minimum, indicating that the king pin inclination reaches its maximum, which is 8°. This state can maximize the aligning torque of the wheel assembly and improve vehicle handling stability. To further enhance wheel-ground contact characteristics, the sum of the first angle and the second angle in the state of the lead-screw nut being at the lower limit position is 1° greater than the steering knuckle inclination in the stationary state, making the camber angle 1°. In this state, the wheel alignment parameters are more suitable for high-speed driving.

Figure 7:
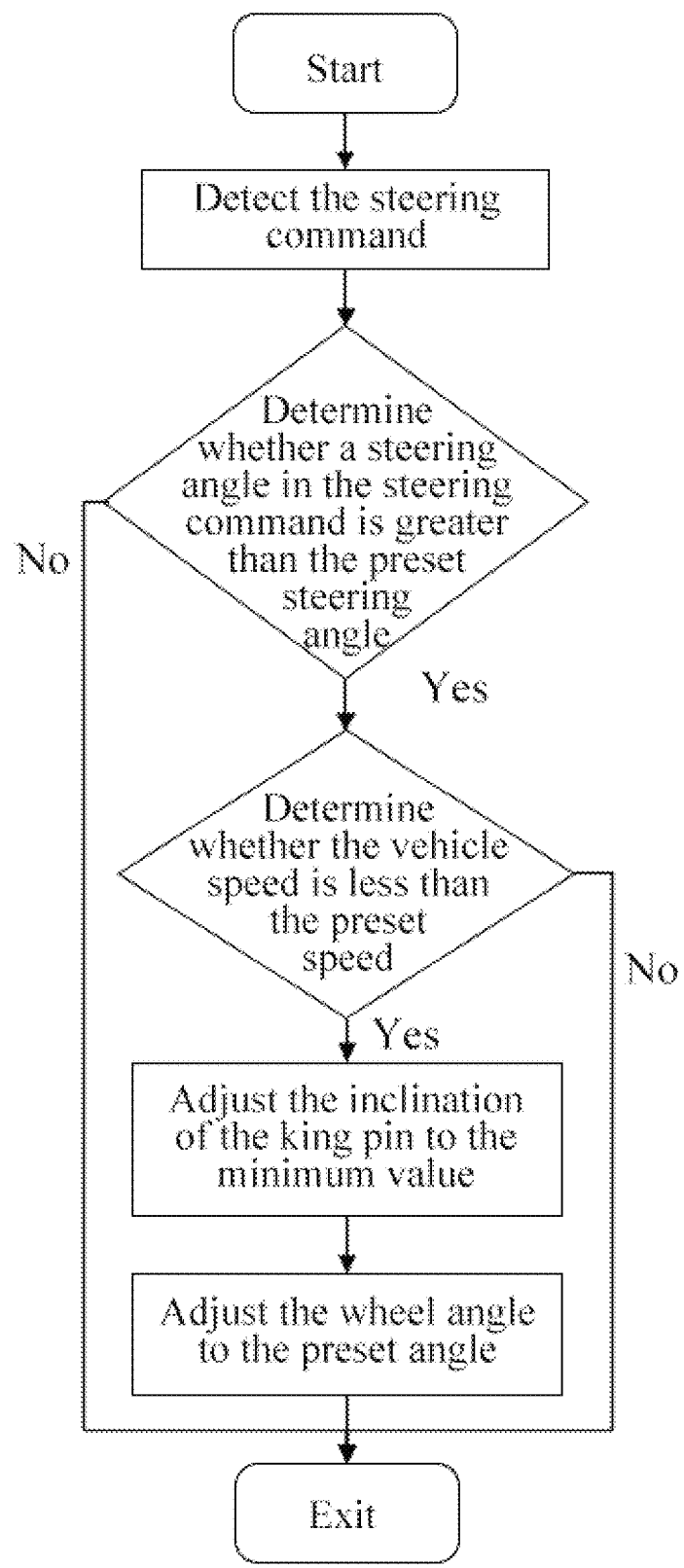
FIG. 7 is a flow chart of an omni-directional steering control method using the in-corner modular electric wheel system according to an embodiment of the present application.

The present application further provides an omni-directional steering control method using the in-corner modular electric wheel system. The specific flowchart is shown in FIG. 7, and the detailed process is as follows.

(S0) An initialization operation is performed.

(S1) A steering control unit detects a steering command sent by a vehicle driver or an autonomous driving decision unit and an omni-directional steering control action is executed.

(S2) The steering control unit determines whether a steering angle in the steering command is greater than a preset steering angle. If yes, the omni-directional steering control action continues to be executed. Otherwise, S6 is executed to exit the omni-directional steering control action.

(S3) The steering control unit detects a vehicle speed and determines whether the vehicle speed is less than a preset speed. If yes, the omni-directional steering control action is continuing. If not, S6 is executed to exit the omni-directional steering control action and report an exit reason for safety.

(S4) The steering control unit gives a first operation command to the actuator motor. After receiving the first operation command, the actuator motor adjusts actively the king pin inclination to a minimum value. The actuator motor reports an inclination adjustment completion command.

(S5) After receiving the inclination adjustment completion command, the steering control unit gives a second operation command to the steering motor. After receiving the second operation command, the steering motor adjusts a wheel angle to a preset angle and the steering control unit reports a steering completion command of a steering action.

(S6) After receiving the steering completion command, the steering control unit completes the omni-directional steering control action and reports a completion signal.

The operation principles of individual systems of the in-corner modular electric wheel system are described as follows.

The operation principle of the drive system is described as follows. Upon receiving a drive signal from the driver or decision-making unit, the external-rotor motor outputs drive torque through the outer rotor. This drive torque is first transmitted to the housing of the drive motor fixedly connected to the outer rotor, then through the thread holes on the housing of the drive motor to the hub, and finally, the hub transmits the drive torque to the ground via the tires, thereby driving the vehicle forward.

The operation principle of the braking system is described as follows. Upon receiving a braking signal from the driver or decision-making unit, the braking system generates a braking actuation force that actuates the brake calipers to clamp the brake disc, so as to allow the brake disc to generate braking torque. This braking torque is transmitted through the threaded holes of the drive motor in the center of the brake disc to the housing of the drive motor. The housing of the drive motor, through the hub and tires connected to the housing of the drive motor, transmits the braking torque to the ground, producing a braking force, thereby forcing the vehicle to stop.

The operation principle of the steering system is described as follows. Upon receiving a steering signal from the driver or decision-making unit, the steering motor generates steering torque, which is transmitted through the output end of the steering motor to the steering deceleration mechanism. After the steering torque is amplified by the steering deceleration mechanism, it is transmitted via the spline of the output end of the steering deceleration mechanism and a pin shaft to the king pin and the steering arm. The steering arm and the king pin transmit the steering torque to the wheel bracket respectively via pin shafts at their wheel bracket lugs. The wheel bracket, through the threaded holes for the wheel shaft at its center, transmits the steering torque to the wheel shaft using bolts. The wheel shaft transmits the steering torque to the hub and brake disc through its first hub bearing and second hub bearing respectively. The brake disc, following the same transmission path as in the braking process, transmits the steering torque to the hub. The hub transmits the steering torque to the tire. This allows the wheel assembly to rotate around the king pin, thus controlling the vehicle's lateral movement. It is worth noting that if the actuator motor is not outputting torque, although the housing of the actuator motor assembly rotates with the king pin, the internal torque of the actuator motor cannot drive the lead-screw to rotate, so the wheel alignment parameters remain unchanged.

The operation principle of the king pin inclination adjusting system is described as follows. Upon receiving a signal to change the king pin inclination from the driver or decision-making unit, the actuator motor generates output torque. This torque is transmitted from the output end of the actuator motor to the deceleration mechanism of the actuator motor. The deceleration mechanism amplifies the torque and transmits it via a spline to the lead-screw to drive the lead-screw to rotate. The king pin-to-suspension assembly connecting rod connects the lead-screw nut to the steering knuckle, thereby preventing the lead-screw nut from rotating. Thus, when the lead-screw rotates, the lead-screw nut moves linearly relative to the axis of the adjustable king pin. The lead-screw nut then transmits the actuation force to the wheel bracket and the steering knuckle through the king pin-to-wheel assembly connecting rod and the king pin-to-suspension assembly connecting rod, respectively. Due to the constraint of the pin shaft between the king pin and the wheel bracket, the wheel bracket rotates relative to the pin shaft of the king pin. Due to the constraint of the ball pin between the king pin and the steering knuckle, the steering knuckle rotates relative to the ball pin of the king pin. These movements alter the first angle and the second angle, thereby changing the king pin inclination and the camber angle. Notably, the presence of the nut collar of the lead-screw nut ensures that during the steering process, the king pin-to-wheel assembly connecting rod does not drive the lead-screw nut to rotate, thus preventing interference between the steering movement and the change in the king pin inclination.

The operation principle of the suspension system is described as follows. When the wheel assembly is subjected to vertical loads, the presence of the upper wishbone and the lower wishbone allows the shock absorber assembly to produce relative motion, generating damping force or elastic force. These resistances are transmitted through the support arm of the shock absorber assembly to the lower wishbone, thus limiting the further movement of the lower wishbone. The lower wishbone transmits these resistances through the pin shaft hole of the steering knuckle and a pin shaft to the steering knuckle. The steering knuckle then transmits these resistances through the ball pin and the king pin-to-suspension assembly connecting rod to the king pin and the lead-screw nut, respectively. Furthermore, the king pin and the lead-screw nut transmit these resistances through the pin shaft of the wheel bracket and the king pin-to-wheel assembly connecting rod to the wheel bracket, respectively. The wheel bracket, after receiving these resistances, transmits the resistances to the wheel shaft. The wheel shaft, through its first hub bearing and second hub bearing, transmits these resistances to the hub and the brake disc, respectively. The brake disc, following the same transmission path as in the braking process, transmits these resistances to the hub. The hub then transmits the resistance to the tire, thus manifesting in the vertical movement of the wheel assembly, mitigating impacts and reducing vibrations. Similarly, if the suspension system is equipped with an actuator, it can transmit the actuator's actuation force to the wheel assembly through a similar transmission route, thus generating vertical movement. Notably, due to the different angles of the king pin-to-suspension assembly connecting rod and the king pin-to-wheel assembly connecting rod, part of the force transmitted to the lead-screw nut will be transmitted to the king pin through the lead-screw and the tapered roller bearing.

Due to the addition of the king pin between the traditional wheel assembly and suspension system, the forces acting on the king pin for various loads that the tire might endure were analyzed as follows.

When the wheel assembly is subjected to a longitudinal force, the tire transmits the force through the hub to the housing of the drive motor. Simultaneously, the force is transmitted via the brake disc connected to the housing of the drive motor. The hub and brake disc respectively transmit the force to the wheel shaft through the first hub bearing and second hub bearing. The wheel shaft transmits the force through the flange at its rear end via bolts to the wheel bracket. The wheel bracket then transmits the force to the lead-screw nut and the king pin through the pin shaft of the king pin and the king pin-to-wheel assembly connecting rod, respectively. The lead-screw nut transmits the force to the steering knuckle through the king pin-to-suspension assembly connecting rod and the king pin transmits the force to the steering knuckle through the ball pin. Notably, due to the different angles of the king pin-to-suspension assembly connecting rod and the king pin-to-wheel assembly connecting rod, part of the force transmitted to the lead-screw nut will be transferred to the king pin through the lead-screw and the tapered roller bearing, and the force received by the steering knuckle is then transmitted through the pin shaft to the upper wishbone and lower wishbone. The upper wishbone and lower wishbone subsequently transmit the force to the vehicle body or subframe, thereby achieving the force transmission from the wheel assembly to the vehicle body.

When the wheel assembly is subjected to a longitudinal moment, this direction of force transmission differs from that of a longitudinal force. The hub no longer transmits the force to the wheel shaft through the first hub bearing and second hub bearing. Instead, the force is transmitted to the wheel shaft through the internal torque of the drive motor via the spline or to the wheel bracket through the braking torque generated by the brake disc and brake caliper.

When the wheel assembly is subjected to an external steering torque, this direction of force transmission differs from that of a longitudinal force. The wheel bracket no longer transmits the torque through the king pin-to-wheel assembly connecting rod. Instead, the torque is transmitted through the pin shaft of the king pin and steering arm to the king pin and steering motor. If the king pin inclination is not zero at this time, the restoring torque generated during wheel steering can resist the external steering torque applied to the wheel assembly.

Similarly, when the wheel assembly is subjected to lateral forces, vertical forces, and yawing moments, the force transmission path is similar to that of longitudinal forces, and is not elaborated here.

The present application has been described in detail above with reference to embodiments, but is not limited thereto. It should be understood that various modifications, variations and replacements made by those skilled in the art without departing from the spirit of the disclosure shall fall within the scope of the disclosure defined by the appended claims.

What is claimed is:

1. An in-corner modular electric wheel system, comprising:
    a wheel assembly;
    a steering system;
    a king pin inclination adjusting system; and
    a suspension system;
    wherein the wheel assembly is configured to support a load of a vehicle, transmit a driving torque and determine a toe angle and a camber angle; a drive motor and a braking system are provided inside the wheel assembly to control longitudinal acceleration and deceleration of the vehicle;
    the steering system is a king pin steering system, and is configured to perform omni-directional wheel-independent steering; the steering system comprises a steering motor assembly, a king pin and a steering arm; the king pin is connected to the wheel assembly through a first pin shaft, and the steering arm is connected to the wheel assembly through a second pin shaft, so as to drive the wheel assembly to deflect to control a lateral movement of the vehicle;
    the king pin inclination adjusting system is integrally sleeved on the king pin; the king pin inclination adjusting system is connected to the wheel assembly through a first connecting rod, and is connected to the suspension system through a second connecting rod; the king pin inclination adjusting system is coaxially provided with an actuator motor and a lead-screw; the lead-screw is provided with a lead-screw nut; the first connecting rod and the second connecting rod are mounted on the lead-screw nut; the actuator motor is configured to drive the lead-screw to rotate, so as to allow the lead-screw nut to move along an axial direction of the king pin to adjust an inclination of the king pin through the linkage without changing the camber angle, thereby enabling active change of a handling characteristic of the vehicle; and
    the suspension system has an unequal-length double-wishbone suspension structure; the suspension system is connected to a bottom of the king pin through a ball pin, and is connected to an upper end of the king pin inclination adjusting system through a third pin shaft; the suspension system is provided with a first lug configured for mounting a steering motor base; the suspension system is further provided with a coil spring and a shock absorber.

2. The in-corner modular electric wheel system of claim 1, wherein the wheel assembly comprises:
    a hub;
    a wheel shaft;
    the drive motor;
    the braking system; and
    a wheel bracket;
    wherein the hub comprises a wheel rim and a spoke; the wheel rim is configured to mount a tire; a center of the spoke is provided with a first through-hole to allow the wheel shaft to pass through; and a plurality of first threaded holes are circumferentially provided at the first through-hole to mount the drive motor;
    a first end of the wheel shaft is provided with a first thread, and is connected to the hub through an end nut and a hub bearing; a middle of the wheel shaft is provided with a first spline and a first shaft shoulder; a second end of the wheel shaft is provided with a flange with a second threaded hole to mount the wheel bracket;
    the drive motor is an external-rotor motor; a stator of the drive motor is splinedly mounted at the first spline; and a rotor of the drive motor is boltedly connected to the plurality of first threaded holes;
    the braking system comprises a brake disc and a brake caliper; the brake disc is boltedly mounted at a housing of the rotor of the drive motor, and is configured to rotate with the hub; the brake caliper is configured to clamp an outer edge of the brake disc; there is a brake clearance between the brake caliper and the brake disc; the brake caliper is provided with a second lug for securing the brake caliper; and
    the wheel bracket has a plate-shaped structure; a middle of the wheel bracket is boltedly mounted at the flange of the wheel shaft; there is an axial clearance between the brake disc and the wheel bracket; a top of the wheel bracket is provided with an upper support arm; a bottom of the wheel bracket is provided with a lower support arm; an upper portion of an inner side of the wheel bracket is provided with a third lug for mounting the steering arm; a middle portion of the inner side of the wheel bracket is provided with a fourth lug for mounting the first connecting rod; a lower portion of the inner side of the wheel bracket is provided with a fifth lug for mounting the king pin; and a front side of the wheel bracket is provided with a sixth lug for fixing the brake caliper.

3. The in-corner modular electric wheel system of claim 2, wherein the steering system further comprises:
the steering motor base;
wherein the king pin has a cylindrical structure; the bottom of the king pin is provided with a third threaded hole to mount the ball pin of a steering knuckle of the suspension system; a middle of the king pin is provided with a seventh lug and a second shaft shoulder for mounting the actuator motor; and a top of the king pin is provided with a second spline;
a first end of the steering arm is provided with an eighth lug; a second end of the steering arm is provided with a ninth lug; the eighth lug is connected to the wheel bracket through the second pin shaft; the ninth lug is connected to the steering motor assembly through a fourth pin shaft; the eighth lug is separated from the ninth lug; a distance between the eighth lug and the ninth lug is variable; an outer side of the ninth lug is provided with a first guide rod; the first guide rod has a cylindrical structure; an inner side of the eighth lug is provided with a second through-hole; and the first guide rod is configured to be in slide fit with the second through-hole to make a length of the steering arm variable;
an output end of the steering motor assembly is connected to the second spline through a first spline slot; both sides of the output end of the steering motor assembly are each provided with the fourth pin shaft to be connected to the ninth lug; a top of the steering motor assembly is provided with a tenth lug; and
a first end of the steering motor base is provided with an eleventh lug; a second end of the steering motor base is provided with a twelfth lug; the eleventh lug is connected to the tenth lug through a fifth pin shaft; the twelfth lug is connected to the steering knuckle of the suspension system through a sixth pin shaft; the eleventh lug is separated from the twelfth lug; a distance between the eleventh lug and the twelfth lug is variable; an inner side of the eleventh lug is provided with a second guide rod; an outer side of the twelfth lug is provided with a third through-hole; and the second guide rod is configured to be in slide fit with the third through-hole to make a length of the steering motor base variable.

4. The in-corner modular electric wheel system of claim 3, wherein the steering motor assembly comprises:
a steering motor; and
a steering deceleration mechanism;
wherein a stator of the steering motor is fixed to a housing of the steering motor; a rotor of the steering motor is connected to an input end of the steering deceleration mechanism; the steering deceleration mechanism is coaxially arranged with the steering motor, and is configured to increase an output torque of the steering motor; an output end of the steering deceleration mechanism is provided with the first spline slot to be connected to the second spline to amplify and transmit the output torque of the steering motor to the king pin, wherein the first spline slot is an internal spline slot; both sides of the housing of the steering motor are each provided with the fifth pin shaft to mount the steering arm; and a top of the housing of the steering motor is provided with the tenth lug to be connected to the steering motor base through the fifth pin shaft.

5. The in-corner modular electric wheel system of claim 3, wherein the king pin inclination adjusting system comprises:
an actuator motor assembly;
the lead-screw;
the first connecting rod;
the lead-screw nut; and
the second connecting rod;
wherein the actuator motor assembly is sleeved on the king pin, and is connected to the seventh lug through a seventh pin shaft; and an output end of the actuator motor assembly is provided with a third spline;
the lead-screw is hollow, and is sleeved on the king pin through a tapered roller bearing; a bottom of the lead-screw is provided with a second spline slot, and is connected to the output end of the actuator motor assembly; an outer side of the lead-screw is provided with a second thread to ensure that the lead-screw nut is self-locked on the lead-screw under the action of an external force in a case that the lead-screw does not rotate, so as to make wheel alignment parameters fixed; and each of top and bottom ends of the second thread is provided with a limit structure to restrict a maximum axial displacement of the lead-screw nut; and
the first connecting rod is provided with a first pin shaft hole and a second pin shaft hole; the first connecting rod is connected to the lead-screw nut through the first pin shaft hole and an eighth pin shaft; the first connecting rod is connected to the wheel bracket through the second pin shaft hole and a ninth pin shaft;
the lead-screw nut is threadedly mounted on the lead-screw; a lower end of an external surface of the lead-screw nut is sleevedly provided with a nut collar; the nut collar is configured to rotate relative to an axial direction of the lead-screw nut, and restrict an axial movement of the lead-screw nut; both sides of the upper end of the lead-screw nut are each provided with the third pin shaft to be connected to the second connecting rod; and both sides of the nut collar are each provided with the eighth pin shaft to be connected to the first connecting rod; and
the second connecting rod is provided with a third pin shaft hole and a fourth pin shaft hole; the second connecting rod is connected to the third pin shaft through the third pin shaft hole and a tenth pin shaft; and the second connecting rod is connected to the steering knuckle through the fourth pin shaft hole and an eleventh pin shaft.

6. The in-corner modular electric wheel system of claim 5, wherein the actuator motor assembly comprises:
the actuator motor; and
a deceleration mechanism;
wherein the actuator motor is a hollow internal-rotor motor; and a stator of the actuator motor is boltedly connected to the seventh lug; and
a rotor of the actuator motor is in splined connection with an input end of the deceleration mechanism; and the deceleration mechanism is configured to increase and transmit an output torque of the actuator motor to the lead-screw through the third spline.

7. The in-corner modular electric wheel system of claim 5, wherein the suspension system comprises:
a shock absorber assembly;

an upper wishbone;
a shock absorber arm;
a lower wishbone; and
the steering knuckle;
wherein the shock absorber assembly comprises the shock absorber and the coil spring; the shock absorber has a cylindrical structure; the shock absorber and the coil spring are arranged coaxially; a bottom of the shock absorber assembly is provided with a support rod; the shock absorber assembly is configured to cushion road impact and reduce vibration amplitude;

the upper wishbone comprises two first swing arms intersecting with each other; an intersection of the two first swing arms is provided with a fifth pin shaft hole for connection with the steering knuckle; an end of each of the two first swing arms away from the intersection of the two first swing arms is provided with a sixth pin shaft hole for connection with a body of the vehicle or a subframe of the vehicle;

the shock absorber arm has a cylindrical tube structure; a top of the shock absorber arm is provided with a mounting hole to be fixedly connected to the support rod; and a bottom of the shock absorber arm is provided with a thirteenth lug;

the lower wishbone comprises two second swing arms intersecting with each other and a cross arm; the lower wishbone has an A-shaped structure; an intersection of the two second swing arms is provided with a seventh pin shaft hole to be connected to the steering knuckle; an end of each of the two second swing arms away from the intersection of the two second swing arms is provided with an eighth pin shaft hole for connection with the body of the vehicle or the subframe of the vehicle; and an upper end surface of the lower wishbone is provided with a fourteenth lug to be connected to the thirteenth lug through a twelfth pin shaft; and the steering knuckle has an L-shaped structure; a bottom of the steering knuckle is provided with a ball pin seat to be connected to the king pin through the ball pin; an upper portion of an inner side of the steering knuckle is provided with a fifteenth lug, and the fifteenth lug is connected to the upper wishbone through a thirteenth pin shaft; a lower portion of the inner side of the steering knuckle is provided with a sixteenth lug, and the sixteenth lug is connected to the lower wishbone through a fourteenth pin shaft; an upper portion of an outer side of the steering knuckle is provided with a seventeenth lug, and the seventeenth lug is connected to the second connecting rod through the eleventh pin shaft; and a top of the steering knuckle is provided with the first lug to be connected to the steering motor base through the sixth pin shaft.

8. The in-corner modular electric wheel system of claim 7, wherein an angle between the king pin and the steering knuckle is configured as a first angle; an angle between the king pin and the wheel bracket is configured as a second angle; in a case that the vehicle is in a stationary state and a position of the steering knuckle is determined, the first angle is configured to determine the inclination of the king pin, and the first angle and the second angle are configured to determine the camber angle; and a position of the fourth lug, a position of the fifth lug, a length of the first connecting rod, a length of the second connecting rod, a position of the ball pin seat, a position of the seventeenth lug, and a structure of the second thread are configured such that the first angle is variable, and a sum of the first angle and the second angle does not change during motion of the lead-screw nut between an upper limit and a lower limit, thereby making the camber angle unchanged while changing the inclination of the king pin.

9. A steering control method using the in-corner modular electric wheel system of claim 1, comprising:

detecting, by a steering control unit, a steering command sent by a vehicle driver or an autonomous driving decision unit; and determining, by the steering control unit, whether a steering angle in the steering command is greater than a preset steering angle, if yes, executing a steering control action;

detecting, by the steering control unit, a vehicle speed; determining, by the steering control unit, whether the vehicle speed is less than a preset speed, if yes, continuing to perform the steering control action; otherwise, exiting the steering control action and reporting an exit reason;

giving, by the steering control unit, a first operation command to the actuator motor; after receiving the first operation command, adjusting, by the actuator motor, the inclination of the king pin to a minimum value; reporting, by the actuator motor, an inclination adjustment completion command;

after receiving the inclination adjustment completion command, giving, by the steering control unit, a second operation command to the steering motor; after receiving the second operation command, adjusting, by the steering motor, a wheel angle to a preset angle, and reporting, by the steering motor, a steering completion command; and after receiving the steering completion command, completing, by the steering control unit, the steering control action, and reporting, by the steering control unit, a completion signal.

\* \* \* \* \*